United States Patent Office 2,992,262
Patented July 11, 1961

2,992,262
PROCESS FOR PREPARING BASIC ALUMINUM SALTS OF ALIPHATIC CARBOXYLIC ACIDS
George W. Sears, Jr., and Walter D. Smutz, Wilmington, Del., assignors to E. I. du Pont de Nemours and Company, Wilmington, Del., a corporation of Delaware
No Drawing. Filed Feb. 2, 1959, Ser. No. 790,355
3 Claims. (Cl. 260—448)

This invention relates to new and very useful processes for making basic aluminum salts of short-chain aliphatic carboxylic acids, especially basic aluminum acetates.

Basic aluminum salts of short-chain aliphatic carboxylic acids are well-known and have many uses such as in dyeing mordants, textile water-proofing, anti-perspirants, catalytic preparations, emulsion stabilizers, colored lacquers, and tanning.

In contrast with prior art processes for making such salts, there has now been discovered a process which allows direct conversion of alumina starting materials to dry free-flowing solids without the filtration and washing steps heretofore required in certain of the prior art processes. In addition, this new process eliminates the major difficulty in recovering acid from dilute filtrate and wash water for reuse. Other outstanding advantages will be appreciated by those skilled in the art.

More particularly, this invention is directed to processes for making basic aluminum salts of aliphatic carboxylic acids by contacting a hydrated alumina with the appropriate acid compound while maintaining such acid compound under special vapor phase conditions. In general, the starting materials are hydrated aluminas and short-chain aliphatic carboxylic acids and their anhydrides. The basic aluminum salt products are easily separated, dry, free-flowing solids of high purity.

The hydrated alumina starting materials are chemically characterized by the formula:

(1) $\quad Al_2O_3 \cdot XH_2O$ where X is a positive number not greater than 3 nor less than 0.5. Since hydrated aluminas are often actually mixtures of aluminas which are hydrated to different degrees, the average X for the particular material is commonly some value like 2.2, 1.7, 2.5, etc.

Such alumina starting materials are solids having a particle size below 10 mesh and preferably below 100 mesh (using a standard U.S. Bureau of Standards sieve). Also, these alumina starting materials have surface areas in excess of 100 square centimeters per gram. Such alumina starting materials can be gibbsite, boehmite, or other conventional crystalline structures associated with hydrated aluminas. Also, there can be used the so-called activated aluminas made by removing a portion of the water from gibbsite aluminas. More highly calcined $Al_2O_3 \cdot XH_2O$ when X is below 0.5 are not operative.

Preferred starting materials are boehmites derived from hydrothermal conversion of gibbsite. Such preferred starting materials can be made, for example, by the method described in Tosterud's U.S. Patent No. 1,953,201. Most preferred starting materials are gibbsites derived by the Bayer process such as those sold commercially by the Aluminum Company of America as C–31, C–33, C–730, and by the Reynolds Metals Company as R–5002.

Activated aluminas made by the controlled calcination of gibbsites as sold commercially by the Aluminum Company of America as F–1, F–20, and H–41 aluminas can also be used. Alumina monohydrates such as "Cera" (a trademark) hydrate produced by the British Aluminum Company and alumina monohydrate made by Peter Spence and Sons, Ltd. are also acceptable starting materials for the processes of this invention.

The carboxylic acid compounds particularly useful in the processes of this invention are chemically characterized by the formula:

(2) 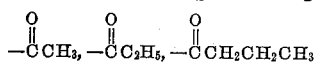

where R is a radical selected from the group consisting of H, $CH_3$—, $C_2H_5$—, $CH_3CH_2CH_2$—, and $(CH_3)_2CH$—, and Y is selected from the group consisting of H, $$-\overset{O}{\underset{\|}{C}}CH_3, -\overset{O}{\underset{\|}{C}}C_2H_5, -\overset{O}{\underset{\|}{C}}CH_2CH_2CH_3$$

and $$-\overset{O}{\underset{\|}{C}}CH(CH_3)_2$$

In the processes of this invention, the anhydrides are as useful as the acids.

In general, especially preferred starting materials are anhydrous acids or even mixtures of acids with the corresponding anhydrides. Technical grades of such acids and anhydrides are, however, entirely satisfactory for the processes of the invention. The preferred acids are formic and acetic acids, and the preferred anhydride is acetic. In fact, the water content of the acid used in the processes of the invention can be as high as 50 weight percent but less than 20 weight percent of water in the acid starting material is preferred.

These respective starting materials, that is, the acid and the alumina, are reacted to produce basic aluminum salts of short-chain aliphatic carboxylic acids. The chemistry involved is described by the following equations:

(3) 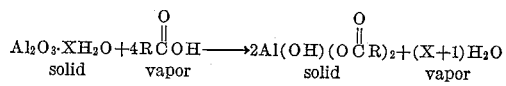
    solid    vapor         solid         vapor (4) 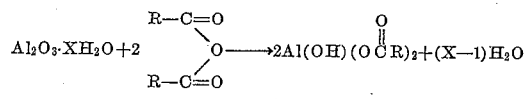

where R and X have the same significance as defined above. (Separate equations for acid and anhydride reactant were used so that balanced equations could appear for clarity.)

This reaction is carried out by contacting the solid alumina with the acid compound in the vapor phase. The amount of water vapor in the acid vapor feed is kept below about 50% by weight to allow the reaction to proceed at a reasonable rate. The acid-water feed mixture is kept superheated to avoid contacting the reactant powders with liquid which would cause hard solid masses to form. Intimate contact between the vapor phase acid compound and the solid alumina is preferably aided by agitation.

Reaction temperatures lie between about 100 and 300° C., preferably 120–240, with about 160 to 200° C. being still more highly preferred. It must be recognized, however, that the processes of the invention can be operated at temperatures higher than those just mentioned. The maximum upper temperature is determined as a matter of practice by the onset of thermal degradation of the particular acid or acid anhydride feed.

Reaction pressures are usually controlled from about 20 to 5 p.s.i. and preferably from 50 to 5 p.s.i. below the saturation pressure of the acid-water mixtures at the reaction temperature. This can be conveniently accomplished by adjusting the rate of vapor discharge from the reaction vessel. Such pressures keep the acid vapor superheated to avoid local condensation.

Under a common set of reaction conditions for, say, acetic acid, the pressure ranges from 50 to 100 p.s.i.g. for a reaction temperature of about 175° C. However, there is no lower limit to the reaction pressure and reactions can be carried out at atmospheric pressure or even under vacuum.

The amount of acid fed, sometimes called the acid feed rate, is dependent on the amount and type of alumina charged and the rate of reaction. The rate of acid feed is chosen so that the concentration of water in the vapor is kept preferably below about 50 percent by weight and more preferably as low as practicable. In general, for efficient operation it is preferred to keep the water vapor in the feed below about 20 percent by weight.

The stoichiometric quantity of acid necessary for complete conversion of hydrated alumina to basic alumina salt is determined and ordinarily from about 2 to 12 times the theoretical amount of acid will be contacted with the alumina over a period of from about 2 to 6 hours. This corresponds to throughput rates of from about one-third to 6 times the theoretical amount of acid per hour.

Of course, the amount of acid used is not necessarily constant; in fact, it is preferred to feed rapidly at the beginning of the run, when the reaction rate and the consequent formation of water are rapid, and then decrease the feed rate as the reaction rate decreases towards completion. The acid compound is preferably vaporized externally and superheated in a second vessel. This vapor is then passed over and through the hot alumina starting material until the reaction reaches completion.

Water formed in the reaction is thus carried away in the stream of acid vapor withdrawn continuously from the reactor. Upon completion of the reaction, unreacted acid vapor is removed either by purging with dry, inert gas or by evacuation.

The product is then removed. It may also be cooled. Agitation is provided throughout as a matter of preference to maintain the solids in the reactor in a free-flowing powdered state and to aid in removing the product.

Instead of continuously passing the superheated vapors over the dry alumina starting material, the processes of the invention can be carried out as a batch operation. Dry alumina starting material heated to from about 100 to 300° C. is maintained in an evacuated system. The organic acid or acid anhydride is externally vaporized and superheated in a second vessel. The reactor containing the alumina starting material is filled with the vapor to a pressure below the condensation pressure of the vapor at the reaction temperature, as explained. This vapor is then allowed to react until an equilibrium is obtained, which is characterized by a stable reaction pressure. The pressure changes as the reaction proceeds because the vapor composition changes as the acid is depleted and the mixture becomes richer in water from the reaction, so that a stable reactor pressure indicates achievement of the equilibrium condition.

When equilibrium is reached, or when the change in pressure is small indicating that the reaction is approaching equilibrium, the vapor is removed from the reactor and a new charge of vapor is added to the reactor. This process is repeated until the dry alumina starting material has been completely converted to the desired product, as judged by no further change in composition of acid effluent as compared to acid feed.

A completely continuous process can be used to carry out the processes of the invention. The superheated vapors are passed continually over the reactant solids and the converted product is continuously removed. Continuous addition, contacting, and removal of solids and vapor processes are well known in the art. Dry, free-flowing alumina trihydrate, for example, is fed through a pressure lock into a pressurized horizontal trough containing a screw conveyor. The solids are moved slowly along the length of the trough while the superheated vapor passes countercurrently over the solids. Reaction conditions are arranged so that the solids reach the end of the trough opposite the acid feed port when the reaction is complete. Then, they are discharged through another pressure lock.

In all the exemplary processes described above, the acid-water mixture resulting from the reaction can be further processed to recover the acid for reuse. Techniques for the separation of acid-water mixtures are well known in the art. For example, the separation of acetic acid from water can be accomplished by azeotropic distillation, extractive distillation, simple distillation, or extraction. The specific technique employed in this process depends on the water content of the effluent and the chemical and physical nature of the acid.

A major advantage of this process over those known in the art is that up to 50 weight percent of water can be present in the feed stream so that the difficulty of regenerating 100% purity as recycle feed can be circumvented with considerable economic saving.

In the case of hydrated aluminas having values of X in the formula $Al_2O_3 \cdot XH_2O$ between 0.5 and 1.0, the regeneration of acid is very simple. Since only one (or less) mole of water is formed for each mole of basic aluminum salt formed, regeneration of the spent acid can be accomplished by the addition of acid anhydride to the spent acid, equivalent to the acid consumed in making the product. This yields an anhydrous acid which can be reused in the process with no water-separation step.

The invention is further illustrated by the following examples.

*Example 1*

The apparatus consists of a sealed vertical outer tube, within which a smaller open tube containing 0.66 part by weight glacial acetic acid and a small thermometer are held about midway down the tube by an indentation in the outer glass tube. In the bottom of the outer tube, 0.355 part by weight of alumina trihydrate (Reynolds Metals Co. R–5002) is placed and agitated by a small magnetic stirrer. The entire tube assembly is placed in an oil bath and heated to 160° C. and held for two hours. The reaction mass remains dry and free-flowing throughout the run. The product is removed and dried under vacuum at 100° C. The product weighs 0.57 part by weight, which weight corresponds to a conversion of 56.55% of the starting alumina trihydrate to basic aluminum diacetate.

*Example 2*

The apparatus is the same as in Example 1. 0.443 part by weight of alumina trihydrate (Reynolds Metals Co. R–5002) is added to the outer tube, and 0.69 part by weight acetic anhydride is placed in the inner tube. The sealed tube assembly is immersed in an oil bath and reacted for 2 hours at 160° C. The powder remained free-flowing throughout the run. The sample is dried under vacuum at 75° C. Final weight of solids is 0.73 part by weight, which is equivalent to 60% conversion to diacetate.

*Example 3*

The apparatus in this experiment is a 1 liter stainless steel jacketed beaker placed inside a vertical stainless steel autoclave. The beaker is fitted with an agitator and a cylindrical baffle. Lliquid acetic acid is distributed as a falling film over the heated walls of the clave and totally vaporized. The vapors are forced by pressure differences into the inside heated beaker, through the agitated powder, and through a dip tube out of the clave to a water cooled condenser and collected.

One hundred parts by weight of alumina trihydrate (Alcoa's C–31) are charged to the beaker and heated to 180° C. Glacial acetic acid at the rate of 4.93 ml./min. is fed and vaporized from the walls of the autoclave. Reaction pressure is normally controlled at 40 p.s.i.g. by continually adjusting a valve between the effluent line on the clave and the condenser. The vapors leaving the clave are condensed and collected. Samples are taken at 10-minute intervals and titrated with 0.1 N NaOH to a phenolphthalein end-point. The amount of water formed in each interval is calculated. The cumulative amount of water collected is continually compared to the amount of water which could be formed by complete conversion of starting material to diacetate. At the end of 180 minutes, the calculation indicates the reaction is complete. The acid feed is turned off and a nitrogen purge begun. The clave is cooled to room temperature, the nitrogen stopped, and the dry, white, free-flowing product removed. A quantitative chemical analysis shows the material to be converted to 99.9% basic aluminum diacetate.

*Example 4*

The apparatus in this experiment is the same as in Example 3. One hundred parts by weight of alumina trihydrate (Alcoa's C-730) is charged to the inside beaker and heated to 175° C. A mixture of 90% by weight glacial acetic acid and 10% by weight distilled water is fed to the walls of the autoclave at the rate of 5.60 ml./min., and totally vaporized. Reaction pressure is manually controlled at 55 p.s.i.g., as in Example 3. Reaction time is 3 hours, 7 minutes. Conversion to diacetate is approximately 100%.

*Example 5*

The apparatus consists of a steam-heated, 4 liter, vertical, stirred, stainless-steel autoclave. External to the autoclave, a stainless-steel, shell-and-tube heat exchanger is used as a vaporizer. The heating medium is condensing steam.

Three hundred grams of Alcoa's C-31 alumina trihydrate are added to the autoclave as a dry, free-flowing powder. The clave is closed up, and saturated steam at 150 p.s.i.g. (175° C.) is passed through the jacket to heat the solids. The solids are agitated at 75 r.p.m., with a ribbon-type agitator.

When the solids reach 170° C., as measured by a thermocouple located at the bottom of the clave, liquid acetic acid is fed at the rate of about 20 ml./min. to the vaporizer. The vaporizer temperature is held at 175° C. by condensing saturated steam. As the acid begins to vaporize, the pressure in the vaporizer and in the autoclave is allowed to increase to 50 p.s.i.g. The pressure is held at 50 p.s.i.g. by an automatic control valve, which continuously bleeds effluent vapors from the autoclave. The saturation vapor pressure of 80 weight percent acetic acid-water mixture at 170° C. is greater than 50 p.s.i.g., hence the vapors in the clave are superheated at the reaction pressure and temperature. The effluent vapors, after passing through the control valve, are condensed in a water-cooled glass condenser and the liquid collected.

Samples of the condensed liquid collected in 30 minute intervals are titrated against 0.0982 N sodium hydroxide to a phenolphthalein end-point. A simple calculation shows the amount of water formed in the interval. This procedure is repeated until the cumulative amount of water formed is equivalent to the theoretical amount of water which could be formed if the entire 300 grams of starting material are used up. At this point, the acid feed is stopped and the feed line from the vaporizer closed. The pressure is reduced slowly to atmospheric over a period of about 20 minutes, then dry nitrogen is passed over the product until there is no further condensate observed in the cooled-off gas. Then the steam to the autoclave jacket is turned off and cooling water turned on. When the temperature of the solids reaches about 70° C., the nitrogen is turned off, the clave is opened, and the product removed.

The product is a clean, white, free-flowing powder which does not smell of acetic acid. Upon addition of a dilute solution of HCl to a small sample, the entire sample dissolves to give a water-white solution when heated to the boiling point. This indicates 100 percent conversion of the trihydrate to basic aluminum diacetate.

*Example 6*

The apparatus consists of the vaporizer described in Example 5, and a 1 ft. dia. x 2 ft. long horizontal agitated autoclave of about 1.3 cu. ft. capacity. The autoclave is fitted with a steam heated jacket and a steam heated ribbon agitator designed to move the solids toward the center of the clave. Two 3" ports are located at a right angle to the axis, and centered on the top and bottom of the clave. The top port is the solids charging and vapor removal port, while the bottom port is fitted with a valve with a self-wiping seat, for the removal of the dry, free-flowing product.

Six pounds of Alcoa's C-31 alumina trihydrate is added through the charging port, and the agitator is started and run at 15 r.p.m. Saturated steam at 150 p.s.i.g. (175° C.) is fed to the jacket, and the solids temperature is brought to 170° C. Ninety weight percent acetic acid is fed to the vaporizer at the rate of 83 ml./minute. The vapors are fed through two ½" openings below the surface of the dry powder; the vapors pass upward, through the solids, and out through an opening in the solids-charging port. The effluent vapors are condensed in a stainless-steel, shell-and-tube heat exchanger, cooled by water, and collected. The reaction pressure is held at 60 p.s.i.g. by the opening and closing of an automatic valve. At the end of 3 hours reaction the acid-water feed is discontinued, and the pressure is reduced gradually to atmospheric. Dry nitrogen is passed through the solids, until there is no more condensate from the condenser. Then, the jacket steam is turned off and cooling water is passed through the jacket. When the solids reach about 90° C., the nitrogen is turned off and the bottom charging port is opened and the solids are discharged. The agitation is sufficient to remove greater than 95% of the solids. The product is free-flowing and white and easily handled, and the conversion is essentially 100%.

*Example 7*

The equipment is the same as in Example 6. 4.6 pounds of boehmite (α-monohydrate) produced by the method of Tosterud is added through the charging port, and the agitation is started and run at 15 r.p.m. The reactor is heated to 170° C. Glacial acetic acid is pumped from a storage tank to the vaporizer at the rate of 66 ml./min. The reaction pressure is 50 p.s.i.g. The reaction and contacting proceeds as in Example 6. The effluent vapors containing the water of reaction are collected in a regeneration tank. In this case, for 100% conversion, 1.38 lbs. of $H_2O$ formed in the reaction and 19.78 lbs. of 93% acetic acid are contained in the regeneration tank. 7.82 lbs. of acetic anhydride is added to the regeneration tank and the resulting mixture is 27.6 lbs. of 100% acetic acid. This material is then transferred to the feed storage tank and can be reused as process feed.

The procedure for cooling and removal of the dry free-flowing product is the same as Example 6.

*Example 8*

The apparatus in this experiment is the same as used in Example 3. One hundred parts by weight of alumina trihydrate (Alcoa's C-730) is charged to the inside beaker. Steam at 185° C. is fed to both the jacketed beaker holding the alumina and the jacket of the autoclave. Isobutyric acid is then fed to the walls of the autoclave at a rate of 7.9 ml./min. such that it is totally vaporized. The reaction pressure is held manually at 15 p.s.i.g., the vapors passing over the stirred powder before being removed from the autoclave. After 3.5 hours, the acid feed is stopped and the apparatus purged with dry nitrogen after which the autoclave is cooled and opened. The product is a free-flowing white powder, and the conversion to the di-isobutyrate is essentially 100%.

*Example 9*

One hundred parts by weight of alumina trihydrate, Alcoa's C-730, is placed in a muffle furnace through which is passed a slow stream of air. The alumina, in a thin layer, is heated 90 min. at 260° C., then removed. The weight loss indicates the average composition to be equivalent to a dihydrate. This alumina is then charged to the inside beaker of the apparatus described in Example 3. The beaker and autoclave jacket are both heated with steam to 200° C. Propionic anhydride is fed to the walls of the autoclave at a rate of 5.5 ml./min. such that it is totally vaporized. The pressure in the autoclave is held manually at 15 p.s.i.g. After 3 hours the anhydride feed is stopped, and the autoclave is purged with dry nitrogen after which it is cooled and opened. The product is a free-flowing white powder, and the conversion to the dipropionate is essentially 100%.

*Example 10*

One hundred parts by weight of alumina trihydrate, Alcoa's C-31, is placed in a muffle furnace through which is passed a slow stream of dry air. The alumina, spread in a thin layer, is heated 2.5 hours at 365° C. after which the average composition corresponds to the formula $Al_2O_3 \cdot 0.5H_2O$. This alumina is then charged to the inside beaker of the apparatus described in Example 3. The beaker and autoclave jacket are heated with steam to 175° C. Formic acid is then fed to the walls of the autoclave at a rate of 3.2 ml./min. such that it is totally vaporized as it is fed. The pressure in the autoclave is held manually at 60 p.s.i.g. After 3.5 hours, the acid feed is stopped and the clave swept out with nitrogen. The product is a white, free-flowing powder, essentially 100% converted to the diformate.

The claims are:

1. A process for preparing basic aluminum salts of aliphatic carboxylic acids comprising passing a superheated carboxylic acid vapor containing no more than 20 weight percent water, said carboxylic acid having the formula:

$$R-\overset{O}{\underset{\|}{C}}-OY$$

where R is selected from the group consisting of hydrogen and alkyl radicals of from one to three carbon atoms and Y is selected from the group consisting of hydrogen, and acetyl, propionyl, butyryl and isobutyryl radicals over and through a hydrated alumina of the formula:

$$Al_2O_3 \cdot XH_2O$$

where X is a positive number from 0.5 to 3 inclusive until the acid effluent composition becomes substantially equal to that of the feed acid vapor composition.

2. A process for preparing dry, free-flowing basic aluminum diacetate comprising passing acetic acid, containing no more than 20 weight percent water, maintained exclusively in the vapor phase by using temperatures within the range of 100 to 300° C. and pressures from 20 to 5 p.s.i. below the saturation pressure of the acid-water mixture at the reaction temperature over and through an alumina trihydrate until the acid effluent composition becomes substantially equal to that of the feed acid vapor composition.

3. A process for preparing dry, free-flowing basic aluminum diacetate comprising passing superheated acetic acid vapor, containing no more than 20 weight percent water, at a temperature of about 175° C. and a pressure of about 60 p.s.i.g. over and through a dry alumina trihydrate powder until the acid effluent composition becomes substantially equal to that of the feed acid vapor composition.

References Cited in the file of this patent

UNITED STATES PATENTS 2,595,416    Schmerling _____ May 6, 1952